(12) United States Patent
Li

(10) Patent No.: US 12,148,451 B2
(45) Date of Patent: Nov. 19, 2024

(54) METHOD, APPARATUS, DEVICE, STORAGE MEDIUM AND PROGRAM PRODUCT FOR VIDEO GENERATING

(71) Applicant: Beijing Zitiao Network Technology Co., Ltd., Beijing (CN)

(72) Inventor: Xinwei Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/390,866

(22) Filed: Dec. 20, 2023

(65) Prior Publication Data

US 2024/0355360 A1 Oct. 24, 2024

Related U.S. Application Data

(63) Continuation of application No. PCT/CN2023/138056, filed on Dec. 12, 2023.

(30) Foreign Application Priority Data

Apr. 19, 2023 (CN) .......................... 202310424794.3

(51) Int. Cl.
*G11B 27/036* (2006.01)
*G06F 40/166* (2020.01)

(52) U.S. Cl.
CPC .......... *G11B 27/036* (2013.01); *G06F 40/166* (2020.01)

(58) Field of Classification Search
USPC .................................................. 386/278, 285
See application file for complete search history.

(56) References Cited

U.S. PATENT DOCUMENTS 10,431,216 B1 * 10/2019 Lemon .................... G06F 3/017
10,467,918 B1 * 11/2019 Fieldman ................. G09B 5/10
(Continued)

FOREIGN PATENT DOCUMENTS

| CN | 112232067 A | 1/2021 |
| CN | 112291614 A | 1/2021 |

(Continued)

OTHER PUBLICATIONS

International Search Report received for PCT Patent Application No. PCT/CN2023/138056, mailed on Mar. 7, 2024, 4 pages.

*Primary Examiner* — Nigar Chowdhury

(57) ABSTRACT

The present disclosure relates to a video generating method and apparatus, a device, a storage medium and a program product. The method comprises: acquiring first text information, wherein the first text information is used for describing writing requirements of a video copywriting; generating second text information based on the first text information, wherein the second text information is copywriting information meeting the writing requirements described by the first text information; generating multimedia editing data based on third text information; generating a target video based on the multimedia editing data. Embodiments of the present disclosure provide an efficient one-stop video production scheme, and improve video production efficiency by generating copywriting information meeting the described writing requirements based on the writing requirements describing the video copywriting, and then producing the video according to the generated copywriting information.

19 Claims, 6 Drawing Sheets

(56) References Cited

U.S. PATENT DOCUMENTS

| | | | | |
|---|---|---|---|---|
| 2014/0129942 A1* | 5/2014 | Rathod | ............ | H04N 21/44226 |
| | | | | 715/720 |
| 2015/0371426 A1* | 12/2015 | Levy | ...................... | G06T 13/80 |
| | | | | 345/473 |
| 2016/0189713 A1* | 6/2016 | Liu | ...................... | G06F 40/186 |
| | | | | 704/235 |
| 2018/0350388 A1* | 12/2018 | Jain | ...................... | G11B 27/005 |
| 2019/0076741 A1* | 3/2019 | Thompson | ....... | H04N 21/21805 |
| 2019/0341050 A1* | 11/2019 | Diamant | .............. | G06V 40/172 |

FOREIGN PATENT DOCUMENTS

| | | |
|---|---|---|
| CN | 114120992 A | 3/2022 |
| CN | 114363531 A | 4/2022 |
| CN | 114513706 A | 7/2022 |
| CN | 117082292 A | 11/2023 |
| KR | 10-1968599 B1 | 4/2019 |

* cited by examiner

METHOD, APPARATUS, DEVICE, STORAGE MEDIUM AND PROGRAM PRODUCT FOR VIDEO GENERATING

CROSS-REFERENCE TO RELATED APPLICATION(S)

This application claims priority to Chinese Application No. 202310424794.3 filed Apr. 20, 2023, the disclosures of which are incorporated herein by reference in their entities.

FIELD

The present disclosure relates to the technical field of video processing, and particularly to method, apparatus, device, storage medium and program product for video generating.

BACKGROUND

With the rapid development of computer technology and mobile communication technology, various video platforms based on electronic devices have been widely used, and greatly enriched people's daily life. More and more users are willing to share their own video works on the video platform for viewing by other users.

A user needs to clip and create a video by himself before sharing a video work. In the process of creating the video, the user needs to search for a lot of video materials by himself, for example, pictures, articles, music, etc. Searching for the materials wastes a lot of time, and causes inefficient video production.

SUMMARY

In order to solve the above-mentioned technical problems, embodiments of the present disclosure provide method and apparatus, a device, a storage medium and a program product for video generating, which automatically generate an article based on a keyword input by a user, automatically generate a video based on the generated article, provide an efficient one-stop video production scheme, and improve video production efficiency.

In a first aspect, embodiments of the present disclosure provide a video generating method, comprising:
  acquiring first text information, wherein the first text information is used for describing writing requirements of a video copywriting;
  generating second text information based on the first text information, wherein the second text information is copywriting information meeting the writing requirements described by the first text information;
  generating multimedia editing data based on third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline;
  generating a target video based on the multimedia editing data.

In a second aspect, embodiments of the present disclosure provide a video generating apparatus, comprising:
  a first text information acquisition module configured to acquire first text information, wherein multimedia editing data is generated based on third text information;
  a second text information generation module configured to generate second text information based on the first text information, wherein the second text information is copywriting information meeting writing requirements described by the first text information;
  a multimedia editing data generation module configured to generate multimedia editing data based on the second text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline;
  a target video generation module configured to generate a target video based on the multimedia editing data.

In a third aspect, embodiments of the present disclosure provide an electronic device, comprising:
  at least one processor;
  a storage device for storing at least one program;
  the at least one program, when executed by the at least one processor, causes the at least one processor to implement the video generating method according to any item of the first aspect described above.

In a fourth aspect, embodiments of the present disclosure provide a computer-readable storage medium storing computer program which, when executed by a processor, implements the video generating method according to any item of the first aspect described above.

In a fifth aspect, embodiments of the present disclosure provide computer program product comprising a computer program or instructions which, when executed by a processor, performs the video generating method according to any item of the first aspect described above.

Embodiments of the present disclosure provide a method and apparatus, device, storage medium and program product for video generating. The method comprises: acquiring first text information, wherein the first text information is used for describing writing requirements of a video copywriting; generating second text information based on the first text information, wherein the second text information is copywriting information meeting the writing requirements described by the first text information; generating multimedia editing data based on third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline; generating a target video based on the multimedia editing data. Embodiments of the present disclosure provide an efficient one-stop video production scheme, and improve video production efficiency by generating copywriting information meeting the described writing requirements based on the writing requirements describing the video copywriting, and then producing the target video according to the generated copywriting information.

BRIEF DESCRIPTION OF THE DRAWINGS

The above and other features, advantages, and aspects of embodiments of the present disclosure will become more apparent with reference to the following figures and detailed embodiments. Throughout the figures, the same or similar reference numerals indicate the same or similar elements. It should be understood that the figures are diagrammatic and that elements are not necessarily drawn to scale.

DETAILED DESCRIPTION OF EMBODIMENTS

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein; rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may comprise additional steps and/or omit performing the steps shown. The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that concepts such as "first" and "second" mentioned in the present disclosure are only intended to distinguish between different devices, modules, or units and are not intended to limit the order or interdependence of the functions performed by the devices, modules, or units.

It needs to be appreciated that the modifiers "a (or an)" and "a plurality of" in the present disclosure are intended to be illustrative and not restrictive, and those skilled in the art should understand that the modifiers should be understood as "at least one" unless the context clearly indicates otherwise.

The names of messages or information interacted between devices in embodiments of the present disclosure are for illustrative purposes only and are not intended to limit the scope of such messages or information.

Hereinafter, embodiments of the present disclosure will be described in detail with reference to figures. It should be appreciated that the same reference numbers in different figures are used to denote the same elements already described.

Figure 1:
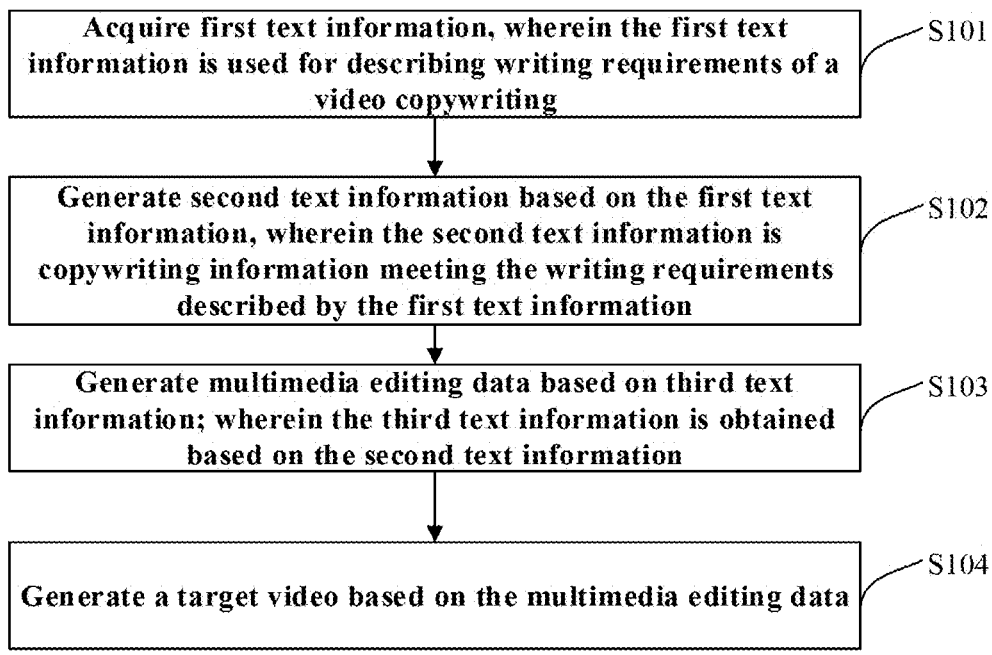
FIG. 1 is a flow chart of a video generating method provided by an embodiment of the present disclosure.

FIG. 1 is a flow chart of a video generating method in an embodiment of the present disclosure, and the embodiment is applicable to a case in which a video is generated according to a keyword. The method may be executed by a video generating apparatus. The video generating apparatus may be implemented in software and/or hardware, and the video generating method may be applied to an electronic device.

It may be appreciated that the electronic device may be any other type of electronic device capable of performing data processing, and may comprise, but is not limited to: a mobile handset, a site, a unit, a device, a multimedia computer, a multimedia tablet, an Internet node, a communicator, a desktop computer, a laptop computer, a notebook computer, a netbook computer, a tablet computer, a personal communications system (PCS) device, a personal navigation device, a personal digital assistant (PDA), an audio/video player, a digital camera/camcorder, a positioning device, a television receiver, a radio receiver, an e-book device, a gaming device, or any combinations thereof, including accessories and peripherals to these devices, or any combinations thereof.

As shown in FIG. 1, a video generating method provided by an embodiment of the present disclosure mainly comprises steps S101-S104.

S101: acquiring first text information, wherein the first text information is used for describing writing requirements of a video copywriting.

In one embodiment of the present disclosure, the writing requirements of the video copywriting may be key content of the target video that the user wants to generate. Specifically, the first text information may be one or more keywords or one or more subject terms describing the video copywriting.

In an exemplary illustration, the user wants to make a video regarding "movie recommendations". The first text information may comprise "movie", "year 2023", "win an award", "good comment", etc. The user wants to make a video about "mobile phone offer", and the first text information may comprise "mobile phone model", "super-large screen", "super-strong battery life", "moderate price", etc.

Figure 2:
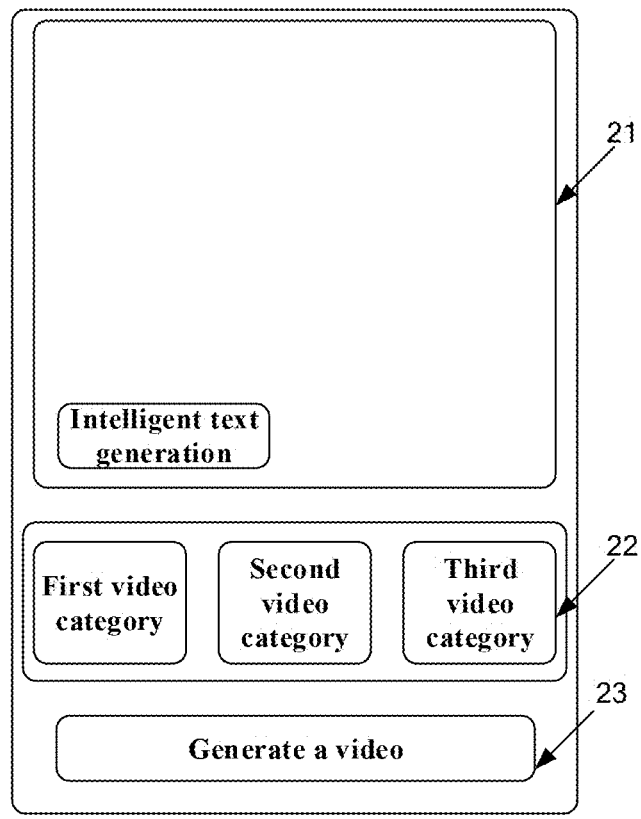
FIG. 2 is a schematic diagram of a video creating page provided by an embodiment of the present disclosure.

In one embodiment of the present disclosure, acquiring first text information comprises: in response to the user's input operation, acquiring the first text information corresponding to the input operation. Specifically, a text making video control is presented in a video creation home page, and a video creation interface is displayed in response to a triggering operation for the text making video control. As shown in FIG. 2, the video creation interface comprises a text creation area 21, a video category selection area 22, and a video generation control 23. The text creation area 21 comprises a text presentation area and an intelligent text generation control. The text presentation area 21 is used for presenting third text information for generating multimedia editing data. The intelligent text generation control is used for displaying a copywriting input interface in response to the user's triggering operation.

Figure 3:
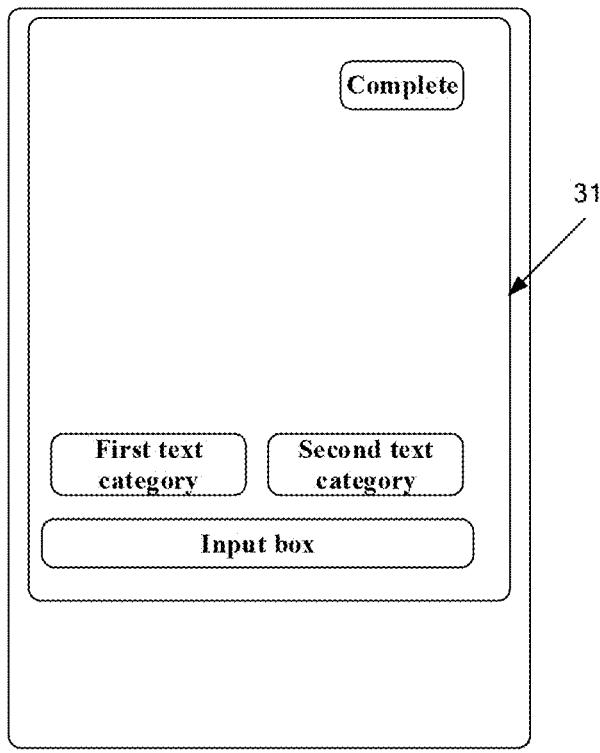
FIG. 3 is a schematic diagram of a copywriting input interface provided by an embodiment of the present disclosure.

In one embodiment of the present disclosure, as shown in FIG. 3, a copywriting input area 31 is included in the copywriting input page, and the copywriting input area 31 displays text information input by the user in response to the user's input operation.

As shown in FIG. 3, the copywriting input area 31 comprises an input box for acquiring the first text information in response to the user's input operation.

S102: generating second text information based on the first text information, wherein the second text information is copywriting information complying with the writing requirements described by the first text information.

In the embodiment of the present disclosure, the second text information refers to text information complying with writing requirements, and further, the second text information is an article with coherence and fluent sentences. The second text information may have one paragraph or a plurality of paragraphs. The second text information may be generated based on the first text information by an intelligent copywriting generation algorithm. Specific implementations of the intelligent copywriting generation algorithm will not be described in detail in the embodiments of the present disclosure.

As shown in FIG. 3, in response to a confirmation operation for the input box in the copywriting input area 31, second text information is generated based on the first text information, and the generated second text information is displayed in the copywriting input area 31.

S103: generating multimedia editing data based on the third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline.

In one embodiment of the present disclosure, the third text information may comprise one or more of the following combination: one or more of second text information, edited second text information, and other text information edited by the user.

In one embodiment of the present disclosure, steps S101-S102 may be performed a plurality of times to generate a plurality of second text information, the generated second text information may be edited and modified, and text information may be manually input in the copywriting input area 31.

In one embodiment of the present disclosure, as shown in FIG. 3, in response to a triggering operation of a completion control in the copywriting input area 31, a switch is made to the video creation interface as shown in FIG. 2, and third text information is displayed in the video creation interface.

In one embodiment of the present disclosure, in a case where the third text information is displayed in the video creation interface, multimedia editing data is generated based on the third text information in response to the triggering operation of the video generation control 23, and the multimedia editing data is presented at the multimedia editing interface.

In one embodiment of the present disclosure, the multimedia editing data further comprises at least one caption editing track segment which is used for filling caption information matching the target text segment.

In one embodiment of the present disclosure, the multimedia editing data further comprises at least one background music editing track segment for filling background music.

Figure 4:
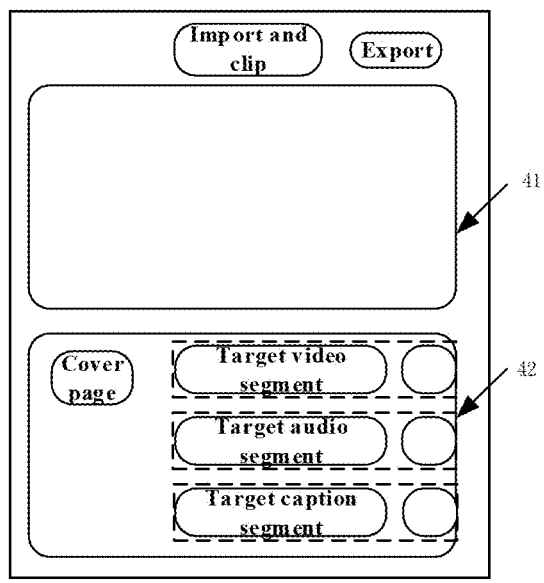
FIG. 4 is a schematic diagram of a multimedia editing page provided by an embodiment of the present disclosure.

In one embodiment of the present disclosure, as shown in FIG. 4, the multimedia editing interface may comprise a video preview area 41 and a multimedia editing track area 42, wherein the video preview area 41 is used for previewing a target video generated by the multimedia editing data. In the multimedia editing track area 42 is presented the multimedia editing data including the video editing track segment, the audio editing track segment, and the background music editing track segment.

In one embodiment of the present disclosure, the target audio editing track segment of the at least one audio editing track segment is used to fill a read speech matching the target text segment, and the target video editing track of the at least one video editing track segment and the target audio editing track segment occupy the same timeline position on a video editing timeline.

In one embodiment of the present disclosure, the target text segment may be a text segment divided from the third text information, and the text segment may be a sentence, or an incomplete sentence formed according to Chinese sentence read-pause rules, or a plurality of sentences, which will not be limited in embodiments of the present disclosure. The target video segment refers to a video segment corresponding to a target text segment, and the target audio segment refers to an audio segment corresponding to the target text segment.

It is noted that the background music in the background music editing track segment is not divided according to the text segment, and a complete audio file is filled.

In one embodiment of the present disclosure, the target video segment is an empty segment.

In an embodiment of the present disclosure, as shown in FIG. 2, in response to a triggering operation of a first video type control in the video creation interface, the video editing track segment in the multimedia editing data is set as the empty segment, i.e., no picture or video image is added in the video editing track segment.

Furthermore, a user-selected picture is added to the empty segment in response to the user's operation of the empty segment. In other words, the user may fill the user-selected picture in the empty segments so that the finished target video meets the user's demands more.

In one embodiment of the present disclosure, the target video segment is used to fill a video image that matches the target text segment.

In an embodiment of the present disclosure, as shown in FIG. 2, in response to a triggering operation for a second video type control in the video creation interface, a video image matching a text segment is filled in the video editing track segment in the multimedia editing data, and the video image may be obtained by matching based on the text segment in a preset picture database based on a picture matching algorithm.

In one embodiment of the present disclosure, the video image may be automatically matched in the picture database based on textual content, thereby preventing the user from spending time searching for materials, and further improving the video production efficiency.

In one embodiment of the present disclosure, the target video segment is used to fill a meme image that matches the target text segment.

In an embodiment of the present disclosure, as shown in FIG. 2, in response to a triggering operation for a third video type control in the video creation interface, a meme image matching the text segment is filled in the video editing track segment in the multimedia editing data, and the meme image may be obtained by matching based on the text segment in a preset meme database based on a preset algorithm.

In one embodiment of the present disclosure, the meme image may be automatically matched in the meme database based on textual content, and a more personalized video may be produced based on the textual content.

In the disclosed embodiment, directing the meme database and the picture database to two databases may avoid the problem of non-uniform video style caused by the presence of both conventional pictures and meme pictures in one video.

S104: generating a target video based on the multimedia editing data.

In one embodiment of the present disclosure, a target video is generated based on the multimedia editing data in response to an operation of triggering video completion.

In one embodiment of the present disclosure, the operation of triggering of video completion may refer to an operation of triggering an export control in the multimedia editing interface. The manner of export may be to store the target video locally, or to share the target video to other video sharing platforms or websites. The manner of export is not specifically limited in embodiments of the present application any more.

In one embodiment of the present disclosure, the multimedia editing data is imported into a video editor for subsequent editing in response to a triggering operation for importing an edit control in to multimedia editing interface.

Figure 5:
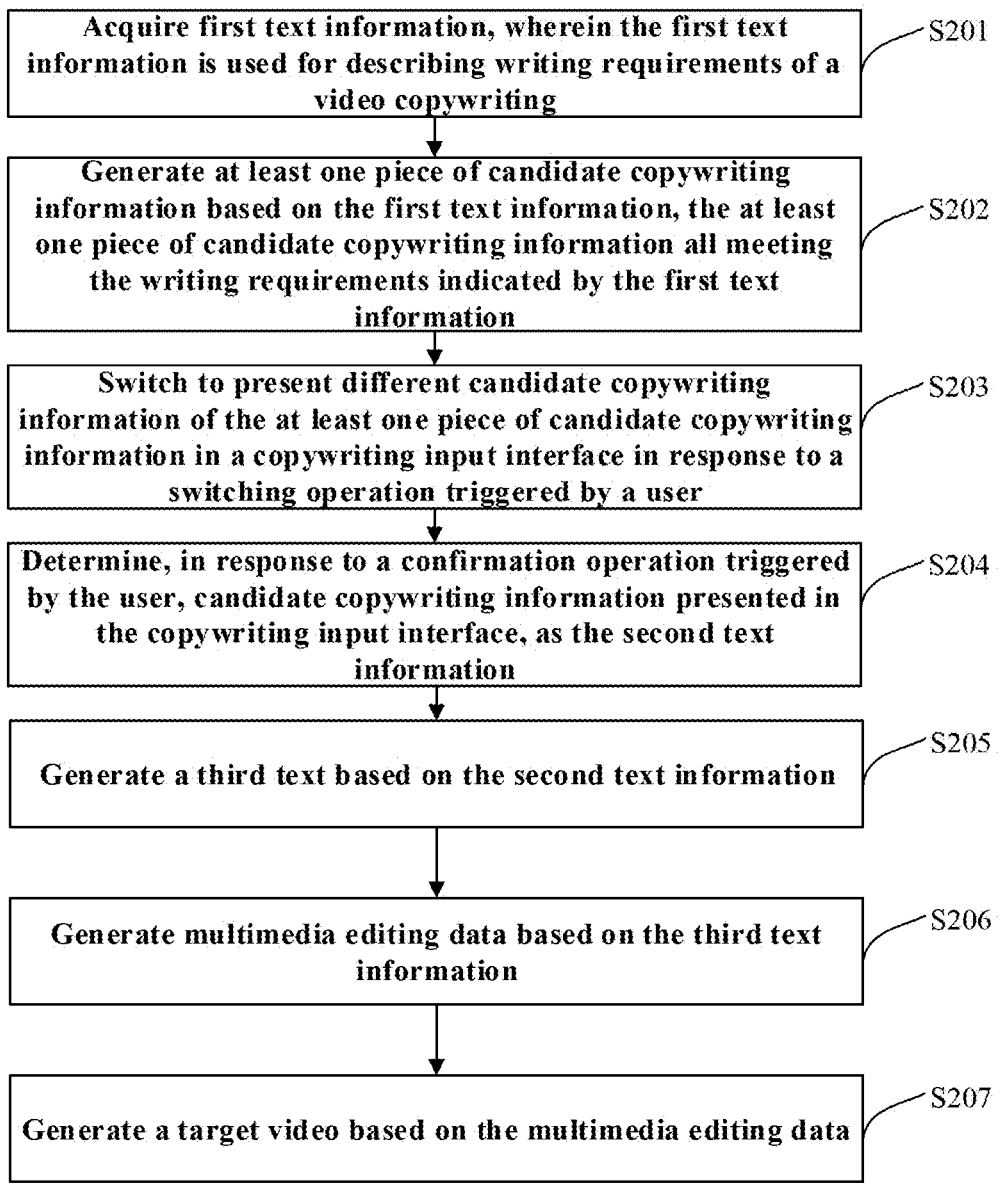
FIG. 5 is a flow chart of a video generating method provided by an embodiment of the present disclosure.

Based on the above embodiment, embodiments of the present disclosure further optimize the video generating method. As shown in FIG. 5, the optimized video generating method mainly comprises the following steps:

S201: acquiring first text information, wherein the first text information is used for describing writing requirements of a video copywriting.

A specific execution process of step S201 provided in the embodiment of the present disclosure is the same as that in the step S101 provided in the above-mentioned embodiment. For particulars, please refer to the depictions in the above embodiment. The specific execution process is no longer specifically limited in the embodiment of the present disclosure.

S202: generating at least one candidate copywriting information based on the first text information, each of the at least one candidate copywriting information meeting the writing requirements indicated by the first text information.

In one embodiment of the present disclosure, a target copywriting category is determined from a plurality of copywriting categories; the candidate copywriting information is generated based on the target copywriting category and the first text information, and the copywriting category of the second text information is the target copywriting category.

In one embodiment of the present disclosure, the copywriting category refers to the category to which the formed copywriting belongs. Specifically, the copywriting category may comprise: a first text category and a second text category, wherein the first text category may be understood as a text category generally applicable to various topics. Specifically, the various topics comprise: science and technology, finance, entertainment, etc. The second text category may be understood as a text category applicable to a product planning category or a product marketing category. In particular, the second text category may introduce selling points of a certain model of mobile phone, or reasons for recommending a certain item, etc.

In one embodiment of the present disclosure, the target copywriting category may be determined based on the user's selection, with each target copywriting category corresponding to an intelligent copywriting generation algorithm model.

In one embodiment of the present disclosure, the copywriting input interface has a first copywriting category control and a second copywriting category control, wherein the first copywriting category control is used for taking a copywriting category corresponding to the first copywriting category control as the target copywriting category in response to a triggering operation of the user; and the second copywriting category control is used for taking a copywriting category corresponding to the second copywriting category control as the target copywriting category in response to a triggering operation of the user.

As shown in FIG. 3, the first copywriting category control and the second copywriting category control are presented in the copywriting input interface. In embodiments of the present disclosure, different copywriting category controls correspond to different prompt information, and different copywriting category controls correspond to different intelligent copywriting generation algorithm models.

In one embodiment of the present disclosure, in response to an operation of selecting the first copywriting category control, prompt information "write a copywriting of the first category with the subject being . . . " is displayed in the input box in the copywriting input area 31. The user may insert the first text information after the prompt information. In response to a confirmation operation for the input box, the first text information is obtained, and at least one of candidate copywriting information is generated based on the first copywriting category and the first text information.

In one embodiment of the present disclosure, generating at least one candidate copywriting information based on the first copywriting category and the first text information comprises: invoking a first intelligent copywriting generation algorithm corresponding to the first copywriting category based on the first copywriting category, and generating a plurality of pieces of candidate copywriting information by using the first intelligent copywriting generation algorithm.

In one embodiment of the present disclosure, in response to an operation of selecting the second copywriting category control, prompt information "write a copywriting of the second category with the products and selling points being . . . " is displayed in the input box in the copywriting input area 31. The user may input the first text information after the prompt information. In response to a confirmation operation for the input box, the first text information is obtained, and at least one candidate copywriting information is generated based on the second copywriting category and the first text information.

In one embodiment of the present disclosure, generating at least one candidate copywriting information based on the second copywriting category and the first text information comprises: invoking a second intelligent copywriting generation algorithm corresponding to the second copywriting category based on the second copywriting category, and generating a plurality of candidate copywriting information by processing the first text information using the second intelligent copywriting generation algorithm.

It should be noted that the first intelligent copywriting generation algorithm and the second intelligent copywriting generation algorithm are two different intelligent copywriting generation algorithms.

In one embodiment of the present disclosure, underlying network models used by the two intelligent copywriting generation algorithms described above may or may not be the same. Training methods of the above-mentioned two intelligent copywriting generation algorithms may be the same or different. It should be appreciated that training samples of the first intelligent copywriting generation algorithm and the second intelligent copywriting are different. The training samples of the first intelligent copywriting generation algorithm is copywriting information of the first copywriting category, and the training samples of the second intelligent copywriting generation algorithm are copywriting information of the second copywriting category.

S203: in response to a switching operation triggered by the user, switching to present different ones of the at least one of candidate copywriting information in the copywriting input interface.

In one embodiment of the present disclosure, in the copywriting input interface there is a candidate copywriting area for displaying the candidate copywriting information. Specifically, the candidate copywriting area is displayed in the text input area 31 in an inserted manner.

In one embodiment of the present disclosure, there is a copywriting switching control in the copywriting input interface. The copywriting switching control is used for triggering the switching operation to switch to present different ones of the at least one of candidate copywriting information in the candidate copywriting area.

Figure 6:
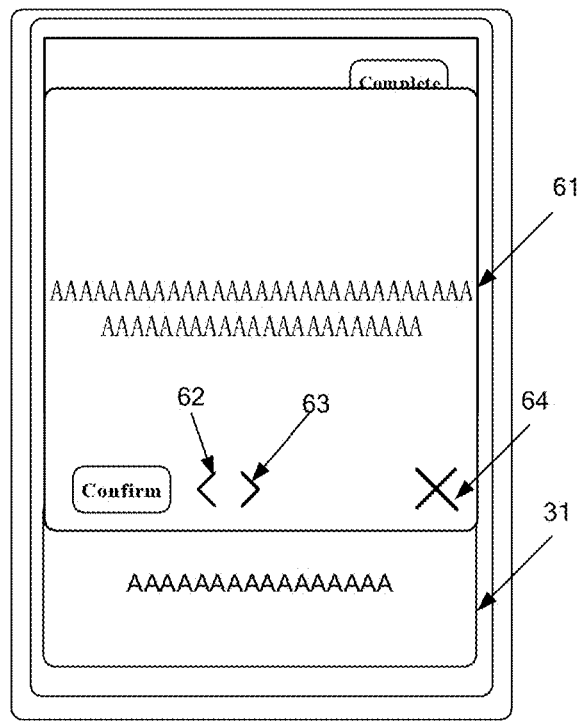
FIG. 6 is a schematic diagram of a copywriting input interface provided by an embodiment of the present disclosure.

In one embodiment of the present disclosure, as shown in FIG. 6, the candidate copywriting area is displayed in the text input area 31 in an inserted form, and the candidate copywriting area 61 comprises a first copywriting switch control 62 and a second text switch control 63.

In one embodiment of the present disclosure, the plurality of pieces of candidate copywriting information is arranged in a preset order, the first text switch control 62 is used to display the candidate copywriting information arranged before current candidate copywriting information in the candidate text area in response to the user's triggering operation, and the second text switch control 63 is used to display the candidate copywriting information arranged after the current candidate copywriting information in the candidate text area in response to the user's triggering operation.

In one embodiment of the present disclosure, illustration is presented by taking five pieces of candidate copywriting information as an example. The five pieces of candidate copywriting information are: candidate copywriting information A, candidate copywriting information B, candidate copywriting information C, candidate copywriting information D and candidate copywriting information E. The copywriting candidate area displays the topmost-ranked candidate copywriting information A. The copywriting candidate area displays the candidate copywriting information B in response to an operation of triggering the second text switch control 63, whereupon the copywriting candidate area displays the candidate copywriting information A in response to an operation of triggering the first text switch control 62.

S204: in response to a confirmation operation triggered by the user, determining, as the second text information, candidate copywriting information which is among the at least one of candidate copywriting information and is switched to be presented in the copywriting input interface.

In one embodiment of the present disclosure, there is a copywriting confirmation control in the copywriting input interface for triggering the confirmation operation such that candidate copywriting information which is among the at least one of candidate copywriting information and is switched to be presented in the candidate copywriting area is determined as the second text information, and the second text information is presented in the copywriting input area.

In one embodiment of the present disclosure, as shown in FIG. 6, the candidate copywriting area 61 has a copywriting confirmation control therein. In response to the triggering operation of the copywriting confirmation control, candidate copywriting information presented in the candidate copywriting area is determined as the second text information, and the second text information is presented in the copywriting input area 31.

In one embodiment of the present disclosure, after the at least one of candidate copywriting information is generated, the candidate copywriting information presented by the candidate copywriting area is inserted at a user input position in the copywriting input area; in response to the confirmation operation, the candidate copywriting area is deleted from the copywriting input area.

In one embodiment of the present disclosure, as shown in FIG. 6, candidate copywriting information (AAAAA) presented by the candidate copywriting area 61 is inserted at a user input position in the copywriting input area 31. The user input position is a position where a cursor is located before candidate copywriting information is generated. Furthermore, the candidate copywriting area is deleted in response to the user's triggering operation of the copywriting confirmation control.

Figure 7A:
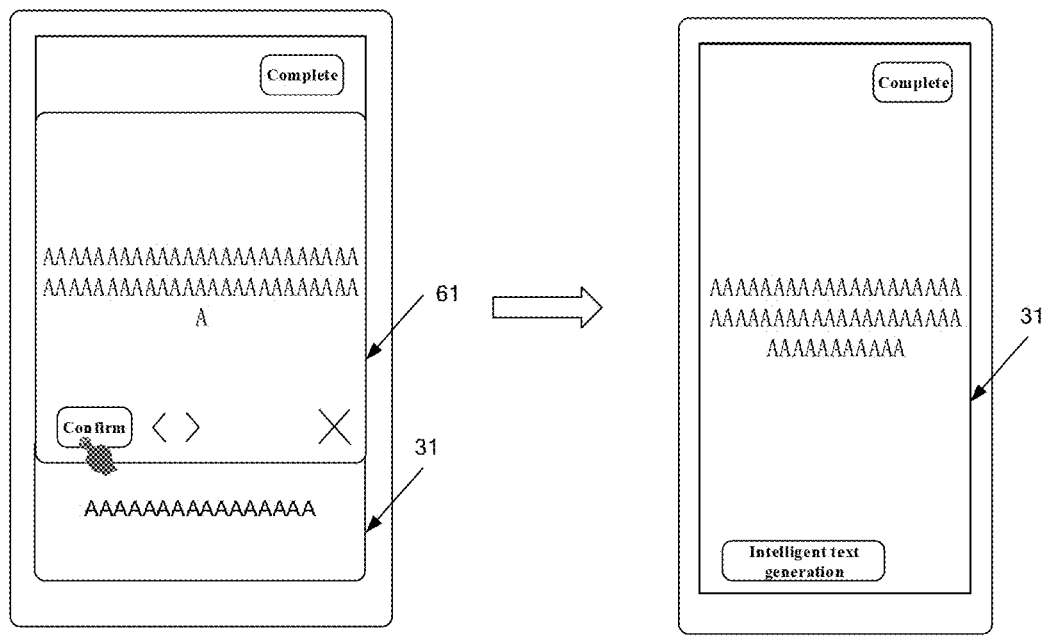
FIG. 7a is a schematic diagram of a copywriting input interface in an embodiment of the present disclosure.

In one embodiment of the present disclosure, as shown in FIG. 7a, if there is no other text information in the copywriting input area before the at least one of candidate copywriting information is generated, the second text information is presented in the text input area 31 after the second text information is determined, and the candidate copywriting area 61 is deleted.

S205: generating a third text based on the second text information.

In one embodiment of the present disclosure, if fourth text information is present in the copywriting input area before the at least one of candidate copywriting information is generated, fifth text information generated by fusing the second text information with the fourth text information is present in the text input area after the second text information is determined.

In the embodiment of the present disclosure, the fourth text information may be the text information manually input by the user, may be the second text information which has been determined using steps S201-S204, or may be the text information modified by the user by editing.

Figure 7B:
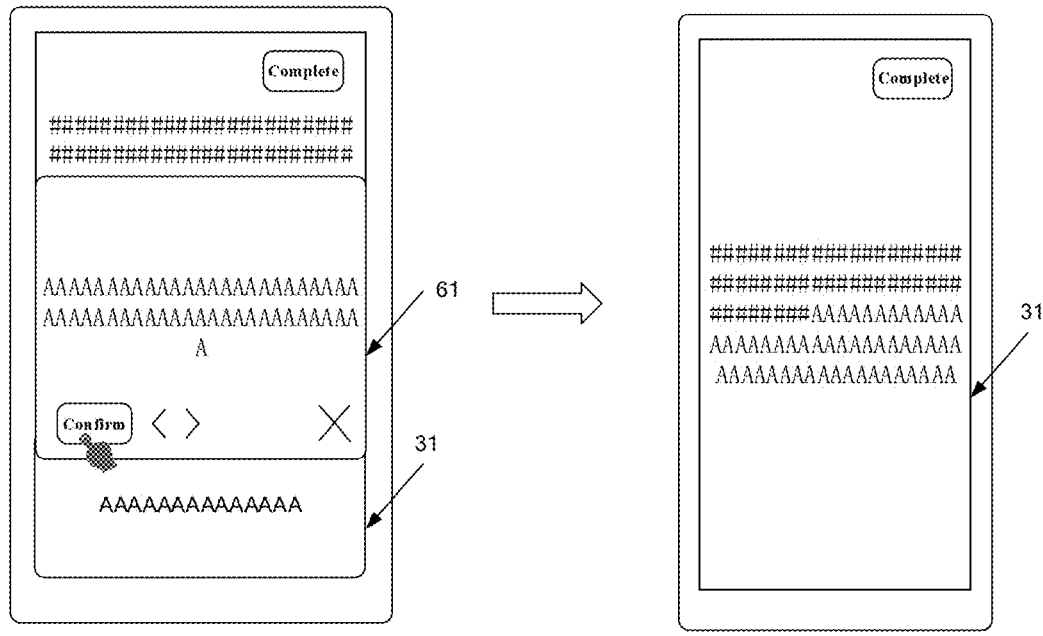
FIG. 7b is a schematic diagram of a copywriting input interface in an embodiment of the present disclosure.

In an embodiment of the present disclosure, as shown in FIG. 7b, if the fourth text information (# # # # # # #) is present in the copywriting input area 31 before the generation of the at least one of candidate copywriting information, and the user input position is at the end of the fourth text information, the candidate copywriting area 61 is displayed at the end of the fourth text information. In response to the user's triggering operation of the copywriting confirmation control, the candidate copywriting area is deleted, and the second text information (AAAAAA) is spliced at the end of the fourth text information (# # # # # # # # #) to form a fifth text information (# # # # # # #AAAAAA), as shown in FIG. 7b. FIG. 7b illustrates by taking the user input position at the end of the fourth text information as an example.

In one embodiment of the present disclosure, if the user input position is located at a middle position of the fourth text information, in the text input area the fourth text information is cut by the candidate copywriting area from the middle position and presented on both sides of the candidate copywriting area, and the second text information is inserted at the middle position of the fourth text information in the fifth text information.

Figure 7C:
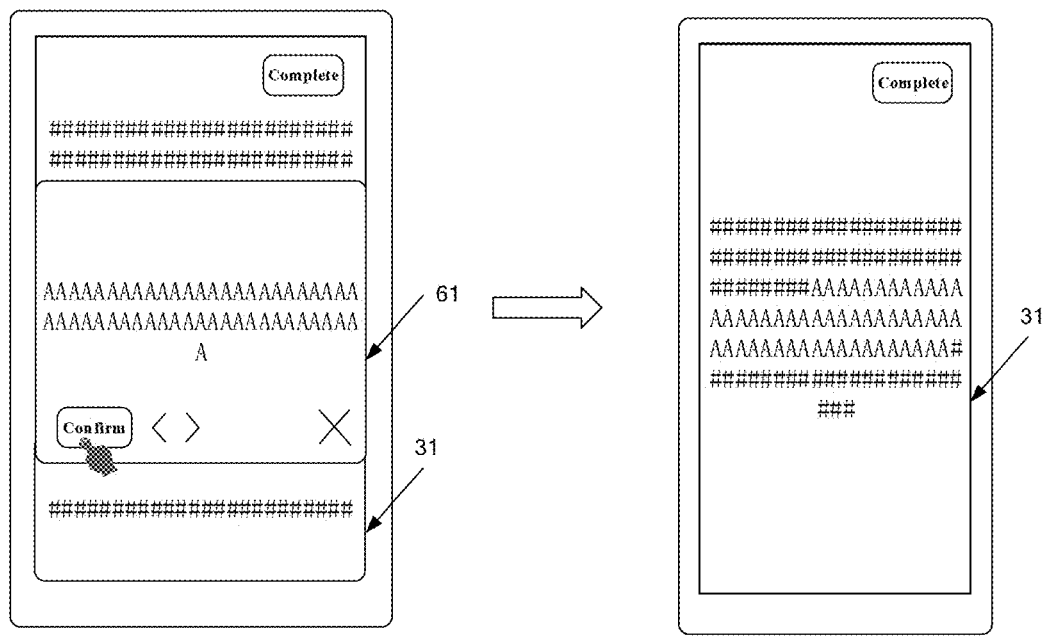
FIG. 7c is a schematic diagram of a copywriting input interface in an embodiment of the present disclosure.

In the embodiment of the present disclosure, as shown in FIG. 7c, if fourth text information (# # # # # # # #) is present in the copywriting input area 31 before the at least one of candidate copywriting information is generated, and the user input position is located at a middle position of the fourth text information, the candidate copywriting area 61 cuts the fourth text information in the copywriting input area 31 from the user input position, and displays two cut parts of the fourth text information on both sides of the candidate copywriting area 61, respectively. Furthermore, in response to the user's triggering operation of the copywriting confirmation control, the candidate copywriting area is deleted and the second text information (AAAAAA) is inserted at the middle position of the fourth text information (# # # # # # # # #) to form the fifth text information (# # #AAAAAA # # # #), as shown in FIG. 7c. FIG. 7c illustrates by taking the user input position at the middle position of the fourth text information as an example.

In one embodiment of the present disclosure, the method further comprises: in response to the user's input operation, acquiring the third text information by editing the fifth text information.

In one embodiment of the present disclosure, as shown in FIGS. 7a, 7b and 7c, there is an intelligent copywriting generation control in the text input area 31. In response to a triggering operation of the intelligent copywriting generation control, a page as shown in FIG. 3 is displayed, wherein the page includes already-confirmed text information. New second text information begins to be generated in response to the operation of the copywriting editing interface as shown in FIG. 3.

In one embodiment of the present disclosure, the fifth text information is edited to obtain the third text information in response to an editing operation of the text input area 31 by a user. The editing comprises operations such as inputting, deleting, copying and pasting.

In one embodiment of the present disclosure, in response to the triggering operation of the completion control in the text input area 31, the copywriting input interface is closed, and third text information is displayed in the text creation area 21 (as shown in FIG. 2).

S206: generating multimedia editing data based on the third text information.

S207: generation a target video based on the multimedia editing data.

A specific execution process of steps S206-S207 provided in the embodiment of the present disclosure is the same as that in the steps S103-S104 provided in the above-mentioned embodiment. For particulars, please refer to the depictions in the above embodiment. The specific execution process is no longer specifically limited in the embodiment of the present disclosure.

Figure 8:
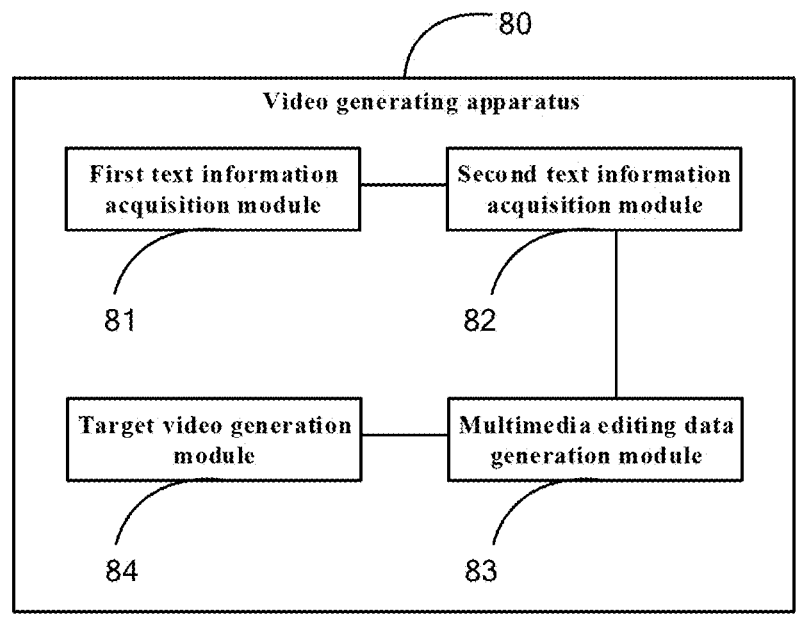
FIG. 8 is a schematic diagram of a video generating apparatus according to an embodiment of the present disclosure.

FIG. 8 is a schematic structural diagram of a video generating apparatus according to an embodiment of the present disclosure. The present embodiment is applicable to a case where a video is generated based on input text. The video generating apparatus may be implemented in software and/or hardware.

As shown in FIG. 8, a video generating apparatus 80 according to the embodiment of the present disclosure mainly comprises: a first text information acquisition module 81, a second text information generation module 82, a multimedia editing data generation module 83 and a target video generation module 84.

The first text information acquisition module 81 is configured to acquire first text information, wherein multimedia editing data is generated based on third text information; the second text information generation module 82 is configured to generate second text information based on the first text information, wherein the second text information is copywriting information meeting writing requirements described by the first text information; the multimedia editing data generation module 83 is configured to generate multimedia editing data based on the second text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, the target audio editing track segment is used to fill a read speech matching the target text segment, and a target video editing track in the at least one video editing track segment and the target audio editing track segment occupy the same timeline position on a video editing timeline; the target video generation module 84 is configured to generate a target video based on the multimedia editing data.

In one embodiment of the present disclosure, the second text information generation module 82 comprises: a candidate copywriting information generation unit for generating at least one of candidate copywriting information based on the first text information, the at least one of candidate copywriting information all meeting the writing requirements indicated by the first text information; a candidate copywriting information switching unit for switching to present different candidate copywriting information of the at least one of candidate copywriting information in a copywriting input interface in response to a switching operation triggered by the user; and a candidate copywriting information confirmation unit for determining, in response to a confirmation operation triggered by the user, candidate copywriting information which is among the at least one of candidate copywriting information and is switched to be presented in the copywriting input interface, as the second text information.

In one embodiment of the present disclosure, the copywriting input interface has a copywriting input area and a candidate copywriting area therein; there is a copywriting switching control in the copywriting input interface, and the copywriting switching control is used for triggering the switching operation to switch to present different ones of the at least one piece of candidate copywriting information in the candidate copywriting area; there is a copywriting confirmation control in the copywriting input interface, and the copywriting confirmation control is used for triggering the confirmation operation to determine candidate copywriting information presented in the candidate copywriting area as the second text information and present the second text information in the copywriting input area.

In one embodiment of the present disclosure, after the at least one of candidate copywriting information is generated, the candidate copywriting information presented by the candidate copywriting area is inserted at a user input position in the copywriting input area; in response to the confirmation operation, the candidate copywriting area is deleted from the copywriting input area.

In one embodiment of the present disclosure, if fourth text information is present in the copywriting input area before the at least one candidate copywriting information is generated, fifth text information generated by fusing the second text information with the fourth text information is present in the text input area after the second text information is determined.

In one embodiment of the present disclosure, if the user input position is located at a middle position of the fourth text information, in the text input area the fourth text information is cut by the candidate copywriting area from the middle position and presented on both sides of the candidate copywriting area, and the second text information is inserted at the middle position of the fourth text information in the fifth text information.

In one embodiment of the present disclosure, the fifth text information is edited to obtain the third text information in response to the user's input operation.

In one embodiment of the present disclosure, the apparatus further comprises: a target copywriting category confirmation module configured to determine a target copywriting category from a plurality of copywriting categories; the candidate copywriting information is generated based on the target copywriting category and the first text information, and the copywriting category of the second text information is the target copywriting category.

In one embodiment of the present disclosure, the copywriting input interface has a first copywriting category control and a second copywriting category control, wherein the first copywriting category control is used for taking a copywriting category corresponding to the first copywriting category control as a target copywriting category in response to a triggering operation of the user; and the second copywriting category control is used for taking a copywriting category corresponding to the second copywriting category control as the target copywriting category in response to a triggering operation of the user.

In one embodiment of the present disclosure, the target video segment is an empty segment; or the target video segment is used to fill a video image matching the target text segment; or the target video segment is used to fill a meme image matching the target text segment.

The video generating apparatus provided by the embodiments of the present disclosure may execute the steps in the video generating method provided by the method embodiments of the present disclosure, and the execution steps and advantages thereof will not be described in detail herein.

Figure 9:
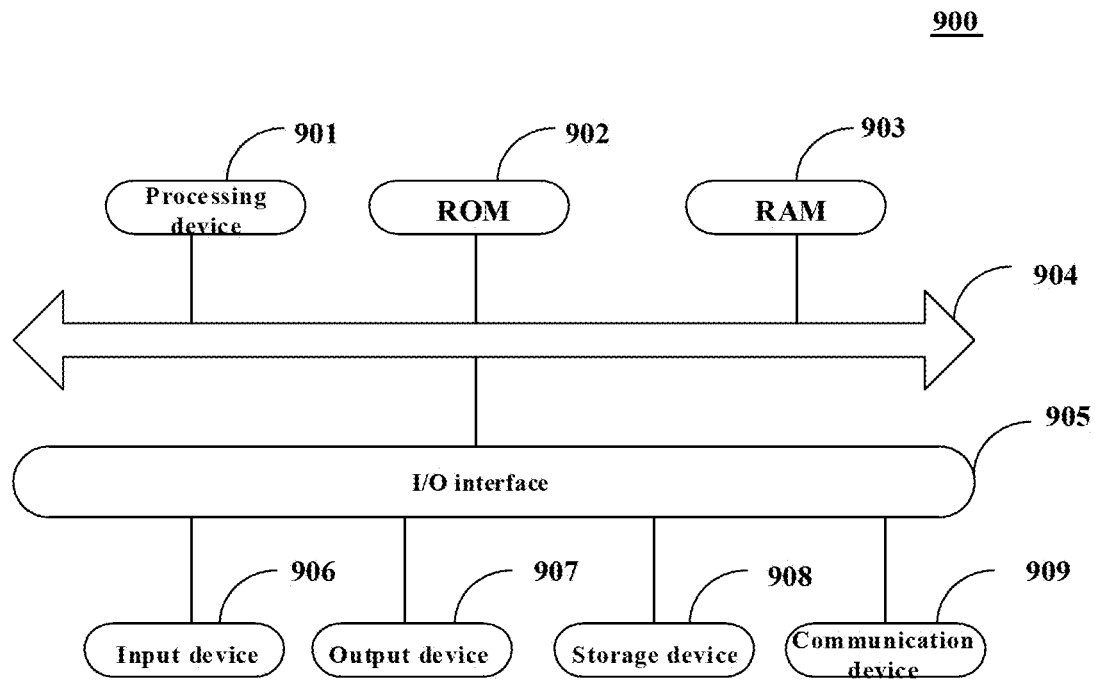
FIG. 9 is a block diagram of an electronic device according to an embodiment of the present disclosure.

FIG. 9 is a schematic structural diagram of an electronic device according to an embodiment of the present disclosure. Reference is now made to FIG. 9, which illustrates a structural schematic diagram of an electronic device 900 suitable for implementing embodiments of the present disclosure. The electronic device 900 in embodiments of the present disclosure may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 9 is merely an example and should not impose any limitations on the functionality and scope of use of embodiments of the present disclosure.

As shown in FIG. 9, the electronic device 900 may comprise a processing device (e.g., a central processing unit, a graph processor, etc.) 901 that may perform various suitable actions and processes in accordance with a program stored in a read only memory (ROM) 902 or a program loaded from a storage device 908 into a random access memory (RAM) 903. In the RAM 903, various programs and data needed by the operation of the electronic device 900 are also stored. The processing device 901, the ROM 902, and the RAM 903 are connected to each other via a bus 904. An input/output (I/O) interface 905 is also coupled to bus 904.

In general, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a speaker, a vibrator, etc.; a storage device 908 including, for example, a magnetic tape, a hard disk, etc.; and a communication device 909. The communication device 909 may allow the electronic device 900 to communicate in a wireless or wired manner with other devices to exchange data. While FIG. 9 illustrates the electronic device 900 having various devices, it is to be understood that not all illustrated devices are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a non-transitory computer-readable medium, the computer program comprising program code for performing the method illustrated by the flow charts. In such embodiments, the computer program may be downloaded and installed from a network via the communication device 909, or installed from the storage device 908, or installed from the ROM 902. When the computer program is executed by the processing device 901, the above-described functions defined in the method of the embodiments of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the client and the server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The computer-readable medium carries one or more programs that, when executed by the terminal device, cause the terminal device to perform the following: acquiring first text information, wherein the first text information is used for describing writing requirements of a video copywriting; generating second text information based on the first text information, wherein the second text information is copywriting information meeting the writing requirements described by the first text information; generating multimedia editing data based on third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline; generating a target video based on the multimedia editing data. Optionally, when the above one or more programs are executed by the terminal device, the terminal device may further execute other steps described in the above embodiments.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special-purpose hardware and computer instructions.

The units described in connection with the embodiments disclosed herein may be implemented in a software or hardware manner. The names of the units do not constitute limitations of the units themselves in a certain case.

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also comprise other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

I claim:

1. A video generating method, wherein the method comprises:
    acquiring first text information, wherein the first text information is used for describing writing requirements of a video copywriting;
    generating second text information based on the first text information, wherein the second text information is copywriting information meeting the writing requirements described by the first text information;
    generating multimedia editing data based on third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline;
    generating a target video based on the multimedia editing data.

2. The method of claim 1, wherein generating second text information based on the first text information comprises:
    generating at least one of candidate copywriting information based on the first text information, the at least one of candidate copywriting information all meeting the writing requirements indicated by the first text information;
    switching to present different candidate copywriting information of the at least one of candidate copywriting information in a copywriting input interface in response to a switching operation triggered by a user;
    determining, in response to a confirmation operation triggered by the user, candidate copywriting information which is among the at least one of candidate copywriting information and is switched to be presented in the copywriting input interface, as the second text information.

3. The method of claim 2, wherein the copywriting input interface has a copywriting input area and a candidate copywriting area therein;
    the copywriting input interface has a copywriting switching control in, and the copywriting switching control is used for triggering the switching operation to switch to present different candidate copywriting information of the at least one of candidate copywriting information in the candidate copywriting area;
    the copywriting input interface has a copywriting confirmation control, and the copywriting confirmation control is used for triggering the confirmation operation to determine candidate copywriting information presented in the candidate copywriting area as the second text information and present the second text information in the copywriting input area.

4. The method of claim 3, wherein after the at least one of candidate copywriting information is generated, the candidate copywriting information presented by the candidate copywriting area is inserted at a user input position in the copywriting input area;
    in response to the confirmation operation, the candidate copywriting area is deleted from the copywriting input area.

5. The method of claim 4, wherein in response to fourth text information is present in the copywriting input area before the at least one candidate copywriting information is generated, fifth text information generated by fusing the second text information with the fourth text information is present in the text input area after the second text information is determined.

6. The method of claim 5, wherein in response to the user input position is located at a middle position of the fourth text information, in the text input area the fourth text information is cut by the candidate copywriting area from the middle position and presented on both sides of the candidate copywriting area, and the second text information in the fifth text information is inserted at the middle position of the fourth text information.

7. The method of claim 5, wherein the method further comprises:
    editing the fifth text information to obtain the third text information in response to the user's input operation.

8. The method of claim 2, wherein the method further comprises:
    determining a target copywriting category from a plurality of copywriting categories; the candidate copywriting information is generated based on the target copywriting category and the first text information, and the copywriting category of the second text information is the target copywriting category.

9. The method of claim 8, wherein the copywriting input interface has a first copywriting category control and a second copywriting category control, wherein the first copywriting category control is used for taking a copywriting category corresponding to the first copywriting category control as a target copywriting category in response to a triggering operation of the user; and the second copywriting category control is used for taking a copywriting category corresponding to the second copywriting category control as the target copywriting category in response to a triggering operation of the user.

10. The method of claim 1, wherein the target video segment is an empty segment; or the target video segment is used to fill a video image matching the target text segment; or the target video segment is used to fill a meme image matching the target text segment.

11. An electronic device, wherein the electronic device comprises:

at least one processor;

a storage device for storing at least one program;

the at least one program, when executed by the at least one processor, causes the at least one processor to:

acquire first text information, wherein the first text information is used for describing writing requirements of a video copywriting;

generate second text information based on the first text information, wherein the second text information is copywriting information meeting the writing requirements described by the first text information;

generate multimedia editing data based on third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline;

generate a target video based on the multimedia editing data.

12. The electronic device of claim 11, wherein the processor is further caused to:

generate at least one of candidate copywriting information based on the first text information, the at least one of candidate copywriting information all meeting the writing requirements indicated by the first text information;

switch to present different candidate copywriting information of the at least one of candidate copywriting information in a copywriting input interface in response to a switching operation triggered by a user;

determining, in response to a confirmation operation triggered by the user, candidate copywriting information which is among the at least one of candidate copywriting information and is switched to be presented in the copywriting input interface, as the second text information.

13. The electronic device of claim 12, wherein the copywriting input interface has a copywriting input area and a candidate copywriting area therein;

the copywriting input interface has a copywriting switching control in, and the copywriting switching control is used for triggering the switching operation to switch to present different candidate copywriting information of the at least one of candidate copywriting information in the candidate copywriting area;

the copywriting input interface has a copywriting confirmation control, and the copywriting confirmation control is used for triggering the confirmation operation to determine candidate copywriting information presented in the candidate copywriting area as the second text information and present the second text information in the copywriting input area.

14. The electronic device of claim 13, wherein after the at least one of candidate copywriting information is generated, the candidate copywriting information presented by the candidate copywriting area is inserted at a user input position in the copywriting input area;

in response to the confirmation operation, the candidate copywriting area is deleted from the copywriting input area.

15. The electronic device of claim 14, wherein in response to fourth text information is present in the copywriting input area before the at least one candidate copywriting information is generated, fifth text information generated by fusing the second text information with the fourth text information is present in the text input area after the second text information is determined.

16. The electronic device of claim 15, wherein in response to the user input position is located at a middle position of the fourth text information, in the text input area the fourth text information is cut by the candidate copywriting area from the middle position and presented on both sides of the candidate copywriting area, and the second text information in the fifth text information is inserted at the middle position of the fourth text information.

17. The electronic device of claim 15, wherein the processor is further caused to:

edit the fifth text information to obtain the third text information in response to the user's input operation.

18. The electronic device of claim 12, wherein the processor is further caused to:

determine a target copywriting category from a plurality of copywriting categories; the candidate copywriting information is generated based on the target copywriting category and the first text information, and the copywriting category of the second text information is the target copywriting category.

19. A computer program product, stored on a non-transitory computer storage medium, comprising computer program or instructions which, when executed by a processor, causes the processor to:

acquire first text information, wherein the first text information is used for describing writing requirements of a video copywriting;

generate second text information based on the first text information, wherein the second text information is copywriting information meeting the writing requirements described by the first text information;

generate multimedia editing data based on third text information; wherein the third text information is obtained based on the second text information; the multimedia editing data comprises at least one video editing track segment and at least one audio editing track segment, wherein the at least one video editing track segment and the at least one audio editing track segment respectively correspond to at least one text segment divided from the third text information, a target audio editing track segment of the at least one audio editing track segment is used to fill a read speech matching the target text segment, and a target video editing track in the at least one video editing track segment and the target audio editing track segment occupy the same timeline position on a video editing timeline;

generate a target video based on the multimedia editing data.

\* \* \* \* \*